C. CLARK.
EMERGENCY BRAKE.
APPLICATION FILED MAY 8, 1911.

1,007,268.

Patented Oct. 31, 1911.

2 SHEETS—SHEET 1.

Witnesses

Clement Clark
Inventor by C.A. Snow & Co.
Attorneys

C. CLARK.
EMERGENCY BRAKE.
APPLICATION FILED MAY 8, 1911.
1,007,268.
Patented Oct. 31, 1911.
2 SHEETS—SHEET 2.
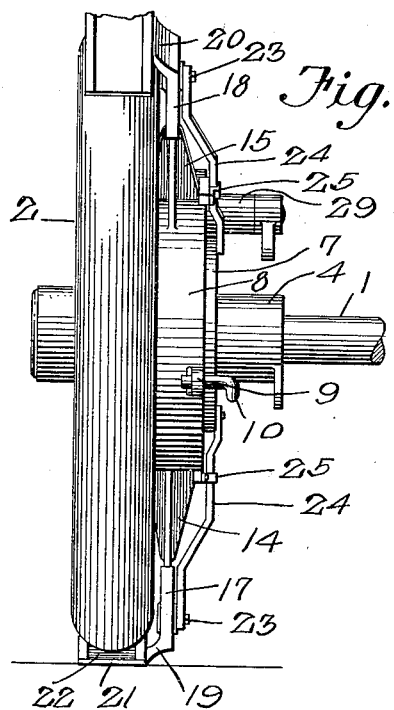
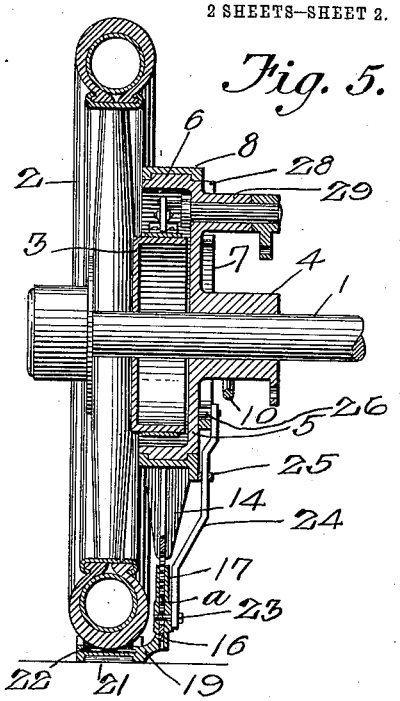
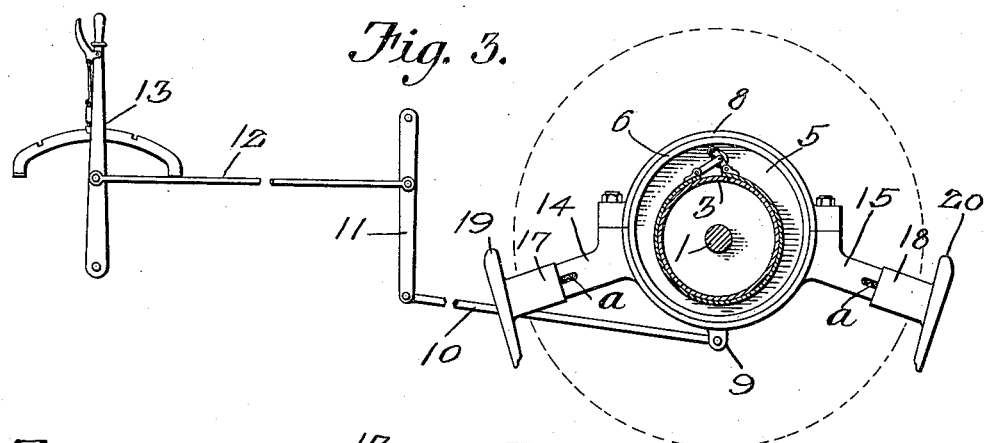
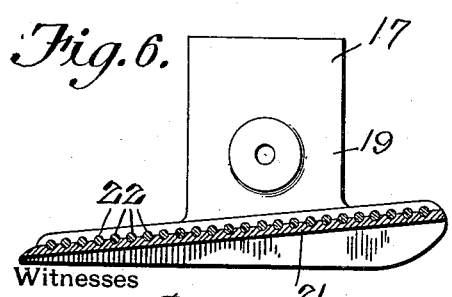
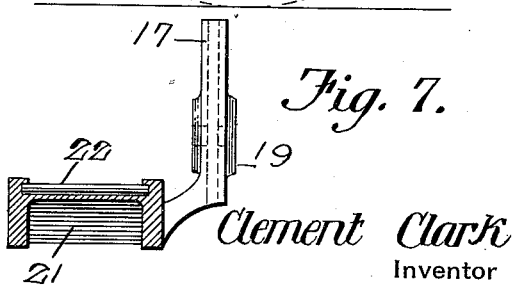
Clement Clark
Inventor

UNITED STATES PATENT OFFICE.

CLEMENT CLARK, OF SANDUSKY, OHIO.

EMERGENCY-BRAKE.

1,007,268.

Specification of Letters Patent.  Patented Oct. 31, 1911.

Application filed May 8, 1911. Serial No. 625,704.

*To all whom it may concern:*

Be it known that I, CLEMENT CLARK, a citizen of the United States, residing at Sandusky, in the county of Erie and State of Ohio, have invented a new and useful Emergency-Brake, of which the following is a specification.

This invention relates to an improvement in emergency brakes, the primary object of the invention being the provision of an emergency brake for vehicles, having means to be interposed between the tire of the vehicle and the ground as the vehicle is moving in either direction, to stop the vehicle, and yet permit the wheels of the vehicle to rotate, so that no great shock is imparted to the wheels of the vehicle or the running gear, but the momentum of the entire vehicle is halted.

A further object of the invention, is the provision of a pair of oppositely operating shoes so disposed with relation to the wheel that they can be thrown between the tire of the wheel and the ground, one being for forward motion of the vehicle and the other for reverse, said shoes being provided with rollers journaled therein to receive the tire and permit it to rotate antifrictionally thereon.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

Figure 1:
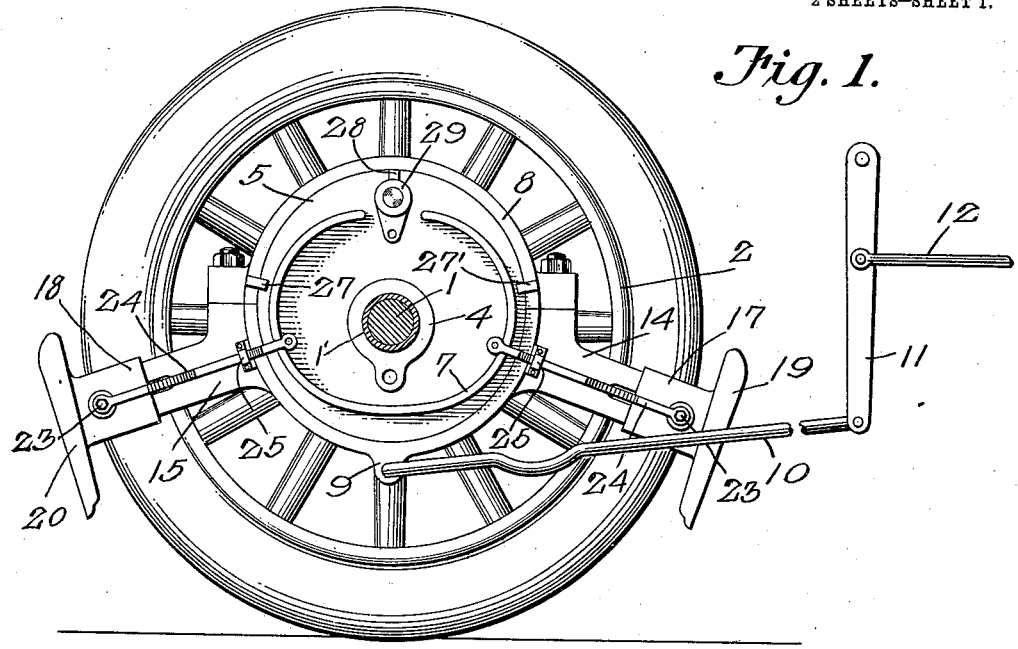
Figure 2:
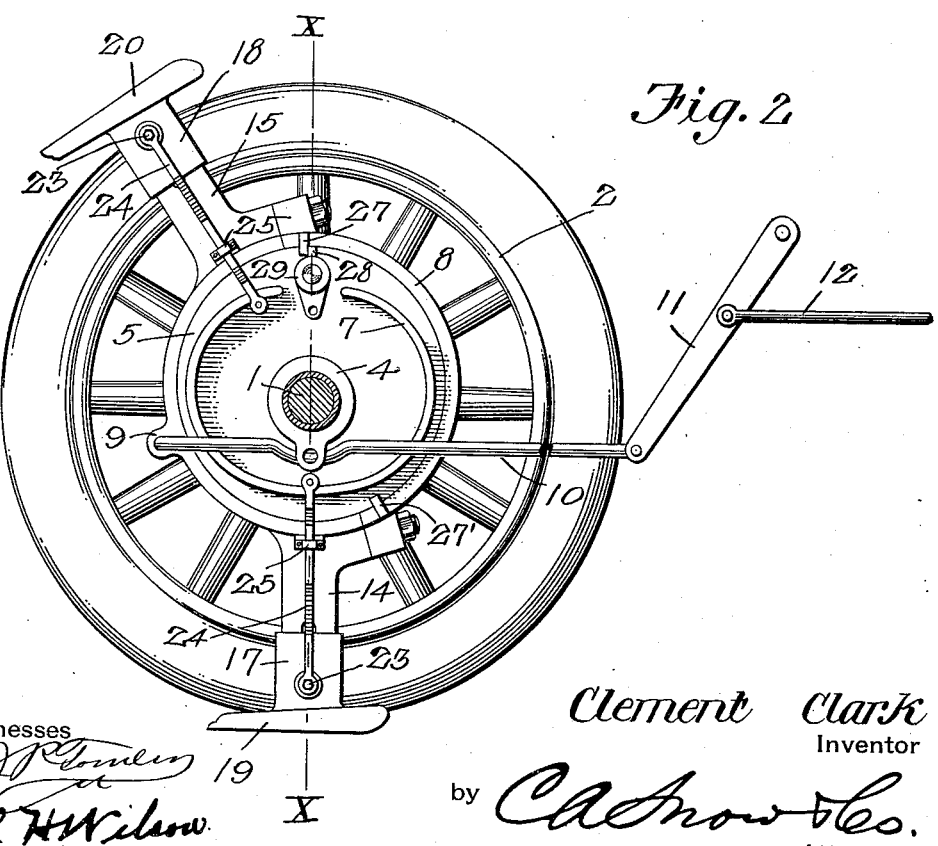

In the drawings:—Figure 1 is a side elevation taken from the inner side of a wheel and axle showing this improved emergency brake applied, said parts being in the position they assume when out of use. Fig. 2 is a similar view with the forward brake shoe applied. Fig. 3 is a view with the shoes in the position shown in Fig. 1, the parts being taken from the wheel side with the wheel removed. Fig. 4 is a front elevation of the device in the position as shown in Fig. 2. Fig. 5 is a vertical section on line X—X of Fig. 2. Fig. 6 is a longitudinal section of one of the shoes. Fig. 7 is a cross section through the shoe.

Referring to the drawings, the numeral 1 designates the rear rotatable axle of an automobile, mounted in its casing 1', having the wheel 2, connected thereto. Mounted upon the wheel is the usual brake drum 3, while mounted upon the axle casing 1' is a hub 4, of the emergency brake mechanism. This hub 4 has formed integral therewith the eccentrically disposed disk or drum 5, having the outwardly projecting annular shouldered flange or rim 6, and is provided upon its inner face intermediate of the hub and rim with the cam strip 7, the purpose of which will presently appear. Slidable circumferentially upon the exterior of the shouldered portion of the rim 6, and therefore exteriorly of the hub 4, is a band or ring 8, which is made in two sections, and is clamped upon the rim 6. Formed integral with and extending outwardly from the ring 8, is an eyed lug 9, to which is connected the operating rod 10, whose forward end is connected to the lever 11, which in turn is operably connected through the link 12, to the emergency brake operating lever 13, which is mounted at any convenient operating position. Formed integral with and extending from the emergency brake ring 8, are the two arms 14 and 15, which when the brake is inoperative, assume the position as shown in Fig. 1, and when braking the wheel or vehicle in a forward direction, assume the position as shown in Fig. 2. The arm 14 is the forward emergency brake shoe carrying arm, while the arm 15 is the reverse emergency brake shoe carrying arm. The arms 14 and 15 are each provided with reduced terminals or projections 16, which fit within the sleeve or socketed ends 17 and 18, of the brake shoes 19 and 20, respectively, each one being provided with a spring $a$, to normally hold the brake shoes extended and away from the tire. Each one of the shoes 19 and 20, is constructed with the bridging portion 21, having journaled upon the upper tire engaging surface a series of antifrictional rollers 22, which when the shoes are placed in the position as shown in Figs. 2, 4 and 5, act as a brake against the further movement of the machine, but permit the wheel to rotate with its tire moving upon the rollers 22, thus the automobile *per se*, may be brought to a full stop, and yet the engine and clutch may be running and the rear axle and wheels rotating without in any way affecting or damaging the running gear of the automobile. Without the rollers 22, this could not happen, as a plain surfaced shoe brought into contact with the tire and ground would bring the tire to a full stop and thus jar the entire machine.

In order to limit the outward movement of the shoes when not in emergency position, the socketed sleeves 17 and 18 are provided with bolts 23, which connect the rods 24 guided in the lugs 25 of the ring 8, and have their inner ends provided with inwardly projecting antifrictional rollered pins 26, which bear at all times upon the inner face of the eccentric cam strip 7, which is so disposed that when the ring 8 is turned in the mutual position as shown in Fig. 1, to permit the springs *a* to move the respective brake shoes out of contact with the tire tread at two points.

By this construction and arrangement of parts, it is evident that to stop a vehicle moving forwardly, the chauffeur or driver, will operate the lever 13 to move the ring 8, to assume the position shown in Fig. 2, and that to stop the vehicle when backing or sliding down hill, during hill climbing, the lever 13 is moved in the opposite direction. The ring 8 is limited in its movement in both directions by means of the stop lugs 27 and 27' carried by the ring, and the stationary stop lug 28 carried by the boss 29, on the disk 5.

What is claimed is:

1. The combination with an axle and a wheel, of an emergency brake, comprising an eccentrically mounted ring adapted to be oscillated, a pair of brake shoes operably carried by said ring and adapted to be interposed between the wheel tire and the ground, one at a time, each of said brake shoes being provided with antifrictional rollers for engagement with the tire, and means for oscillating the ring to place either one of the shoes between the ground and the tread of the wheel.

2. The combination with an axle and a wheel, of an emergency brake, comprising a drum stationarily mounted and eccentric to the axle and wheel, a ring mounted for oscillation upon said drum, means to oscillate said ring, a pair of arms carried by and movable with said ring, a brake shoe carried by each arm, a tire engaging portion provided with an antifrictional tire engaging surface, and means for clamping said tire engaging surfaces to the tire as one of the shoes is interposed between the tire and ground.

3. The combination with a wheel, of a tire engaging emergency brake, comprising an eccentrically mounted disk, a ring adapted to be oscillated thereon, two arms disposed at an angle of substantially 120°, carried thereby, a shoe carried by each of said arms in sliding relation thereto, said shoe being disposed in tire engaging position, and co-acting means carried by the disk and shoe for bringing the shoe into and out of engagement with the tire.

4. The combination with a wheel, of a tire engaging emergency brake, comprising an eccentric disk, a ring, means for oscillating said ring, two arms disposed at an angle of substantially 120°, carried thereby, a shoe slidably connected to and carried by each arm, a spring for normally holding the shoe extended, and co-acting means carried by the disk and shoe for bringing the shoe into contact with the tire and compressing the spring.

5. The combination with a wheel, of an emergency brake, comprising an eccentric disk, a ring, means for oscillating the ring, two arms disposed at an angle of substantially 120° carried thereby, a shoe slidably connected to and carried by each arm, a spring for normally holding the shoe extended, a rod connected to the arm, a cam carried by the disk, and means connecting the shoe and cam together to cause the shoe to project or recede as the ring is oscillated.

6. The combination with a wheel, of an emergency brake, comprising a stationary eccentric disk, a cam carried by said disk, a ring mounted upon the disk, means for oscillating the ring, two brake shoes slidably connected to and carried by said ring, one of said shoes to engage the tire and ground when the ring is oscillated in one direction while the other engages the tire and ground when moved in the opposite direction, and means connected to the cam and shoes for causing the shoes to recede when in tire engaging position and to project when out of engagement with the tire.

In testimony that I claim the foregoing as my own, I have hereto affixed my signature in the presence of two witnesses.

CLEMENT CLARK.

Witnesses:
JOSEPH EBNER,
WM. R. KELHAM.

Copies of this patent may be obtained for five cents each, by addressing the "Commissioner of Patents, Washington, D. C."